G. KNIGHT.
Wheel-Cultivator.

No. 59,232.

Patented Oct. 30, 1866.

Witnesses.
F. A. Jackson
Wm Trewin

Inventor.
Geo Knight
Per Munn & Co
Attys

UNITED STATES PATENT OFFICE.

GEORGE KNIGHT, OF BOONE, IOWA.

IMPROVEMENT IN SULKY-PLOWS.

Specification forming part of Letters Patent No. 59,232, dated October 30, 1866.

*To all whom it may concern:*

Be it known that I, GEORGE KNIGHT, of Boone, in the county of Dallas and State of Iowa, have invented a new and Improved Sulky-Plow; and I do hereby declare that the following is a full, clear, and exact description thereof, which will enable others skilled in the art to make and use the same, reference being had to the accompanying drawings, forming part of this specification, in which—

Figure 1:
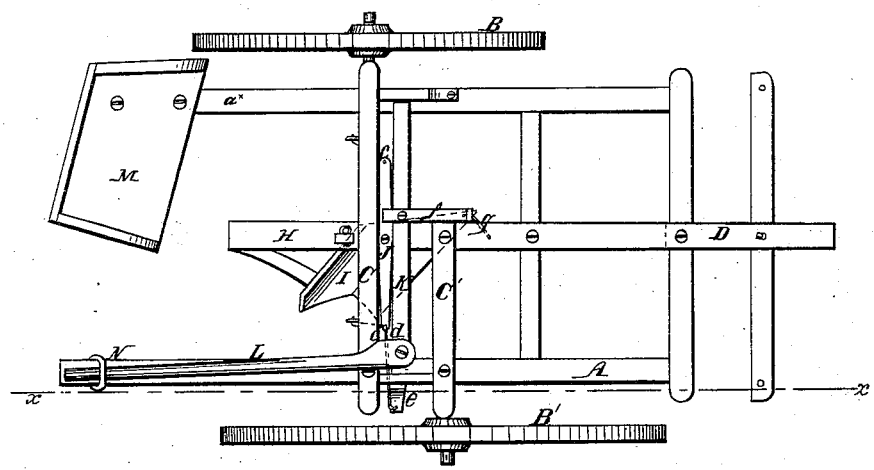
Figure 2:
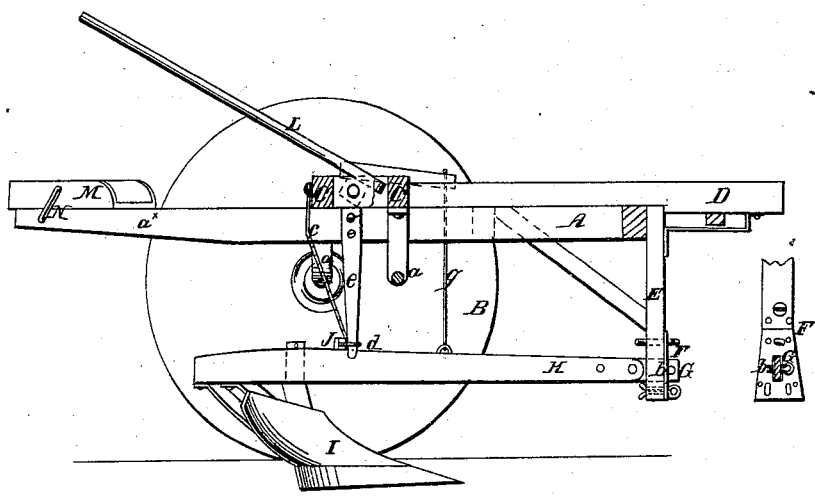

Figure 1 is a plan or top view of my invention; Fig. 2, a side sectional view of the same, taken in the line *x x*, Fig. 1; Fig. 3, a detached front view of a plate pertaining to the Similar letters of reference indicate like parts.

This invention relates to a new and improved plow of that class which are connected with a mounted frame containing a driver's seat, and are commonly termed "sulky-plows;" and it consists in a peculiar construction and arrangement of parts, as hereinafter shown and described, whereby the driver has full control over the plow, and a very simple, efficient, and economical device for the purpose specified obtained.

A represents a rectangular frame, which is mounted on two wheels, B B', the axles C C' of which are secured on the frame, and are provided with a bent or crank arm, *a*, at their outer ends, on which the wheels rotate freely. D is the draft-pole, secured centrally and longitudinally on the frame A, and E is a pendent bar attached to the front end of said frame, said bar having a metal plate, F, attached to it, through which a bar, G, attached to the front end of a plow-beam, H, passes, and is secured in said plate by a bolt, *b*. This plate F may be attached to the bar E higher or lower, or more or less at one side, as required, it having a plurality of bolt-holes made in it for that purpose, and by this adjustment of the plate the front end of the plow-beam may be set higher or lower, or the back edge of the plow raised up or set down, as circumstances may require.

I is the plow, attached to the beam H in the usual way; and J is a bar, attached transversely to the rear part of the plow-beam, and suspended by cords or chains *c c* from the axle C. By lengthening or shortening these chains the depth of the penetration of the plow may be regulated as desired, and the plow is prevented from moving laterally by a chain or cord, *d*, attached to a pendent arm, *e*, on the frame A.

On the frame A there is placed transversely a shaft, K, having an arm, *f*, projecting forward from it at right angles. The outer end of this arm is connected by a cord or chain, *g*, with the plow-beam H.

The shaft K has an arm or lever, L, attached to it, which extends back within convenient reach of the driver on seat M, and the driver, by depressing the outer end of this lever, may raise the plow out of the ground whenever required, and the plow may be retained in an elevated position by catching the lever L under a hook, N, at the side of frame A.

The wheel B' is larger in diameter than the other one, B, in order that it may run in the furrow and admit of the frame A being horizontal, and said wheel B' is placed somewhat in advance of the other, B, in order that the plow may turn its furrow-slice in the rear of the same.

The seat M may be secured more or less forward on the bar $a^*$, to which it is attached, to suit the weight of the driver, so that the latter may serve as a counterpoise to the draft-pole.

Having thus described my invention, what I claim as new, and desire to secure by Letters Patent, is—

1. The attaching of the front end of the plow-beam H to the pendent bar E, through the medium of an adjustable plate, F, substantially as and for the purpose set forth.

2. The suspending of the plow-beam H from the axle C by means of the cords or chains *c c*, and the retaining or holding of the plow-beam, so as to prevent it from moving laterally, by means of a chain or cord, *d*, substantially as set forth.

GEORGE KNIGHT.

Witnesses:
S. J. GAROUTTE,
F. S. GRAHAM.